June 30, 1936.  R. J. ANSCHICKS  2,045,975
HOSE CONNECTION
Filed Sept. 3, 1935
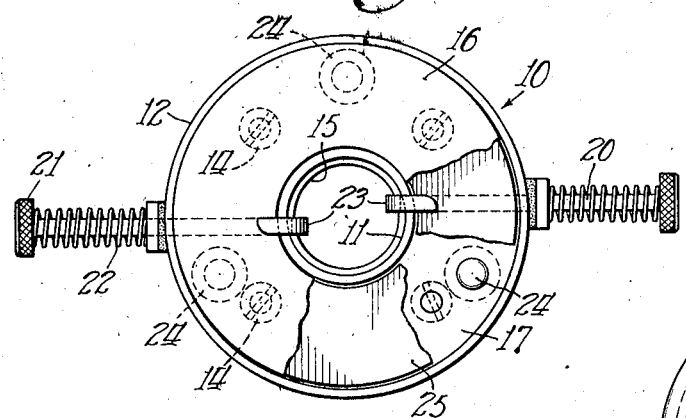
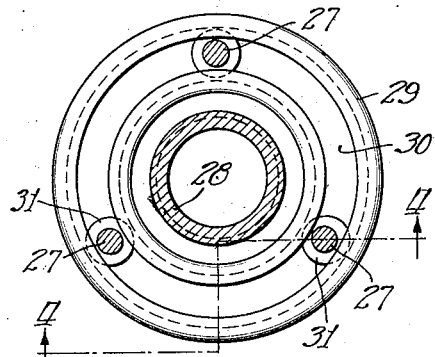
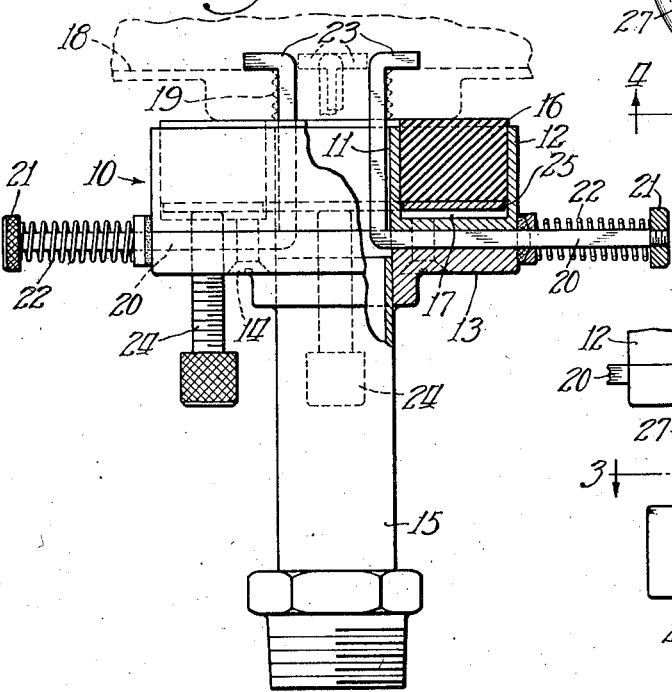
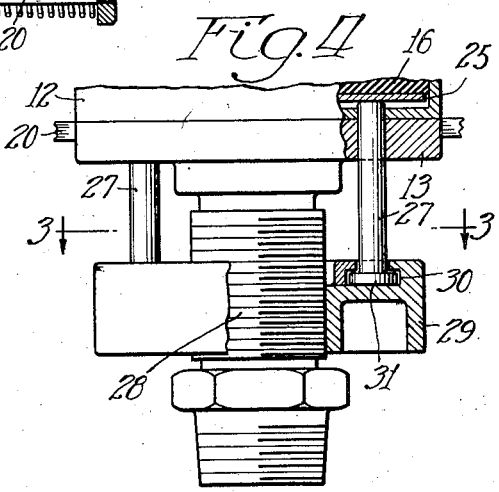
Inventor:
Rudolph J. Anschicks.
By: Still and Still
Attys Patented June 30, 1936

2,045,975

UNITED STATES PATENT OFFICE 2,045,975

HOSE CONNECTION

Rudolph J. Anschicks, Chicago, Ill., assignor to Moses E. Shire, Chicago, Ill.

Application September 3, 1935, Serial No. 38,994

4 Claims. (Cl. 285—44)

My invention relates to hose attachments or fittings and more particularly it relates to a device adapted to connect a tubular fitting with an apertured plate or wall of a receptacle and to form a fluid-tight seal surrounding the aperture whereby liquid may flow through the fitting and plate or vice versa without leakage.

The device is especially adapted for connecting a hose with the drain openings of automobile crank cases as a preliminary to flushing. It is well known that crank cases, after drainage, retain a residue of oil in the form of a film or layer adhering to the side walls and the bottom of the case. This residue contains substantial quantities of carbon, abrasive materials, and other foreign materials which it is desirable to remove before filling the case with a fresh supply of oil.

The flushing of crank cases is frequently accomplished by connecting a hose with a drain or outlet opening and the rapid delivery and withdrawal of hot oil or other suitable material through the hose, the delivery and withdrawal being preferably accelerated by subjecting the liquid successively to pressure and vacuum conditions.

Inasmuch as there is no uniformity in the sizes of the threaded outlet openings of automobile crank cases of different manufacturers or in the thickness of the walls of the crank cases, and since the flushing is usually performed at service or filling stations serving the public generally, such stations have found it necessary to provide a plurality of devices each adapted for threaded connection with a drain opening and each having a diameter different from that of the others. The provision of a plurality of such devices entails a substantial expense since under present conditions a complete equipment requires that at least nineteen different sizes of devices be available. There is also liability of loss or misplacement and incidental confusion and delay in the selective use of so many different devices, all of which expense, delay and confusion is eliminated by the provision of a single device adapted to be operatively connected with the drain openings of crank cases in ordinary use.

It is an object of the invention to provide a universal device adapted to be mounted upon any crank case or similar bounding member having an aperture or opening of a diameter lying within the upper and lower limits of such openings as are provided for crank cases in ordinary use.

Another object of the invention is the provision of an improved device of the kind described which is durable, inexpensive to manufacture and satisfactory for its intended purpose.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawing, wherein like reference characters indicate like or corresponding parts:

Fig. 1 is a plan view of a preferred form of tubular fitting or attachment embodying the principles of the invention;

Fig. 2 is an elevational view partially in section of the device shown in Fig. 1;

Fig. 3 is a view of an alternative embodiment of the invention taken along the line 3—3 of Fig. 4; and Fig. 4 is a view along the line 4—4 of Fig. 3.

Referring now more particularly to the drawing, the numeral 10 generally designates a body member preferably cylindrical and providing an axial bore 11. The body member 10 is shown as comprising two annular members 12 and 13 fastened together by a plurality of screw bolts 14. A nipple 15 is fastened to the member 12 in any suitable manner to form a fluid-tight connection with the bore 11, of a hose or tubular fitting, not shown. A cushion member 16 is positioned in and projects from an annular recess 17 in the member 12, the recess and cushion member being preferably angular in cross section and the cushion member slidably fitting the side walls of the recess. The body member 10 is adapted to be fastened to any apertured plate and is illustrated as mounted on a crank case 18, shown fragmentarily in dotted lines, with the bore 11 in register with a drain opening 19 and with the cushion member clamped against the case to form a fluid tight seal surrounding the opening.

The clamping device includes fastening means operable as hooks and comprising a pair of L-shaped plunger rods 20 each having an arm oppositely extending through the body member 10 adjacent the connection therewith of the nipple 15, with the other arm extending longitudinally of and projecting from the open end of the bore 11. The laterally extending arms each have a nut 21 providing an abutment for a helical spring 22 adapted to hold the rods 20 in the position shown. The rods 20 are oppositely positioned in the body member 10 and are also positioned on opposite sides of and preferably parallel to the same diametrical line so that reciprocation of each rod will be without contact with the others.

Each rod 20 has an outwardly projecting stem or hook 23, preferably parallel or substantially parallel to the laterally projecting arm, the length of the stems being less than the diameter of the aperture 19 in the crank case. The device is attached to the crank case by moving the arms to dotted line position against the resistance of the springs 22 so that both stems 23 may be simultaneously inserted through the opening 19, and upon release of pressure upon the rods, the stems will be moved outwardly by the springs to the full line position shown, wherein they support the device. The spacing of the stems 23 from the end of the body member 10 is sufficient to permit engagement of the steams with the inner face of the crank case and provide a slight clearance between the retracted cushion member 16 and the outer faces or bosses of crank cases having a thickness equal to that of the maximum in ordinary use. The cushion member 16 is then moved into clamping engagement with the crank case by manipulating a plurality of bolts 24, mounted on the body member 10 and having their threaded ends operatively engaging a washer 25 forming a support for the cushion member. The cushion member 16, when clamped against the crank case, forms a fluid-tight seal by adapting itself to irregularities on the surface of the crank case and by spreading laterally press against the side walls of the annular recess 17. The device is removed from the crank case by turning the bolts 24 to permit retraction of the cushion member 16 to disengage it from the crank case and then moving the rods 20 to bring the stems 23 into dotted line position wherein they clear the side walls of the opening 19.

A modified form of the device is shown in Figs. 3 and 4 wherein a threaded nipple 28 is substituted for the nipple 15 and the washer 25 and the cushion member 16 are movable towards the crank case by simultaneously actuating a plurality of rods 27. One end of each rod 27 contacts with the washer 25 and the rods are simultaneously moved towards and away from the cushion member 16 by turning a nut 29 having threaded engagement with the nipple 28. The inner face of the nut 29 provides an annular recess 30 positioned to receive the adjacent ends of the rods 27. A head 31 on the end of each rod 27 fits loosely within the recess 30 and prevents removal of the rods. By threading the nut 29 on the nipple 28, the rods 27 are moved to actuate the washer 25 and the cushion member 16 whereby the cushion member is clamped against the crank case and is laterally expanded to seal the recess 17 and press against the crank case. The cushion member 16 is formed of any suitable material adapted to yield under pressure and effectively seal the space between the body member 10 and the crank case. The device is detached by first releasing the cushion member from clamping engagement with the crank case and then moving the rods 20 to a position corresponding to the dotted line position of the stems 23.

Thus it will be seen that I have provided a device adapted to form a fluid-tight connection for tubular fittings with apertured plates of different thicknesses and wherein the openings have a diameter lying within a range determined by the maximum and minimum diameters of drain openings in crank cases and similar articles.

What I claim as new and desire to secure by Letters Patent is:

1. A device for attaching a tubular fitting to one side of an apertured plate, and comprising a body member having a bore therein adapted to register with the aperture in said plate, a cushion member mounted on said body member adjacent the plate, means for clamping the device to the plate comprising a pair of L-shaped plunger rods mounted on said body member, one arm of each rod extending laterally through and projecting exteriorly from the body member, each of said projecting arms being reciprocally movable in a path parallel or substantially parallel to the other, the other arm of each rod extending longitudinally of and projecting from the bore through the aperture, an out-turned hook on the projecting end of each longitudinally extending arm equally spaced from the body member and each having a length less than the diameter of the aperture in the plate, and means operatively related to said body member and cushion member for urging the latter snugly against the plate to provide a fluid-tight connection adjacent said aperture.

2. A device for attaching a tubular fitting to one side of an apertured plate, and comprising a body member having a bore therein adapted to register with the aperture in said plate, a cushion member mounted on said body member adjacent the plate, means for clamping the device to the plate comprising a pair of L-shaped plunger rods mounted on said body member, one arm of each rod extending laterally through and projecting axially from the body member, each of said projecting arms being reciprocally movable in a path parallel or substantially parallel to the other, the other arm of each rod extending longitudinally of and projecting from the bore through the aperture, an out-turned hook on the projecting end of each longitudinally extending arm equally spaced from the body member and each having a length less than the diameter of the aperture in the plate, resilient means normally maintaining said rods in a position wherein said hooks oppositely overlap the plate, and means operatively related to said body member and cushion member for urging the latter snugly against the plate to provide a fluid-tight connection adjacent said aperture.

3. A device for attaching a tubular fitting to one side of an apertured plate member, said device comprising a body member having a bore therein adapted to register with the aperture in said plate member, a pair of members positioned in and extending longitudinally of said bore and projecting from one end thereof, a hook on the projecting end of each of said members adapted to engage the bounding wall of the plate aperture when said body member and plate member are brought into registering juxtaposition of said bore and aperture, a pair of members oppositely and laterally projecting through the side wall of the body member and respectively rigidly connected with said hook members, said laterally projecting members being respectively manually operable to move said hook members laterally, resilient means normally holding said laterally movable members and hook members in plate engaging position of the latter, a cushion member mounted on said body member adjacent said plate member, and means operatively related to said body member and cushion member for urging the latter snugly against said plate to provide a fluid tight connection adjacent said aperture.

4. A device for attaching a tubular fitting to one side of an apertured plate member, said device comprising a body member having a bore therein adapted to register with the aperture in said plate member, a pair of members positioned in said bore in spaced relation, said members being respectively parallel to the axis of the bore and projecting from one end thereof, a hook on each of said members adapted to engage the bounding wall of the plate when said body member and plate member are brought into registering juxtaposition of said bore and aperture, said hooks having a length less than the diameter of the aperture in the plate, a pair of members oppositely and laterally projecting through the side wall of the body member and respectively rigidly connected with said hook members, said laterally projecting members being respectively manually operable to move said hook members laterally, resilient means normally holding said laterally movable members and hook members in plate engaging position of the latter, a cushion member mounted on said body member adjacent said plate member, and means operatively related to said body member and cushion member for urging the latter snugly against said plate to provide a fluid tight connection adjacent said aperture.

RUDOLPH J. ANSCHICKS.